Sept. 14, 1965 B. F. BURRELL 3,206,228
VIBRATION JOINTS
Filed Sept. 18, 1962
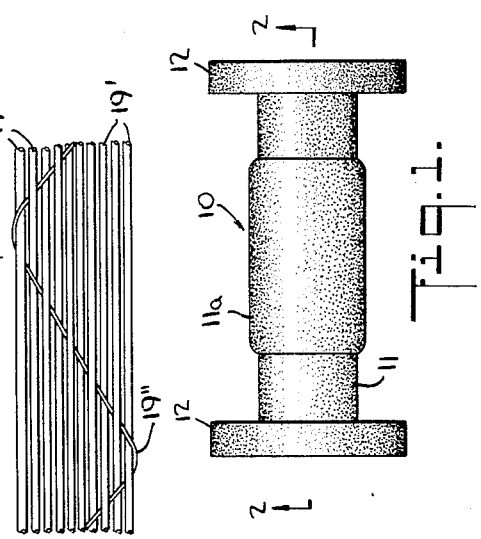
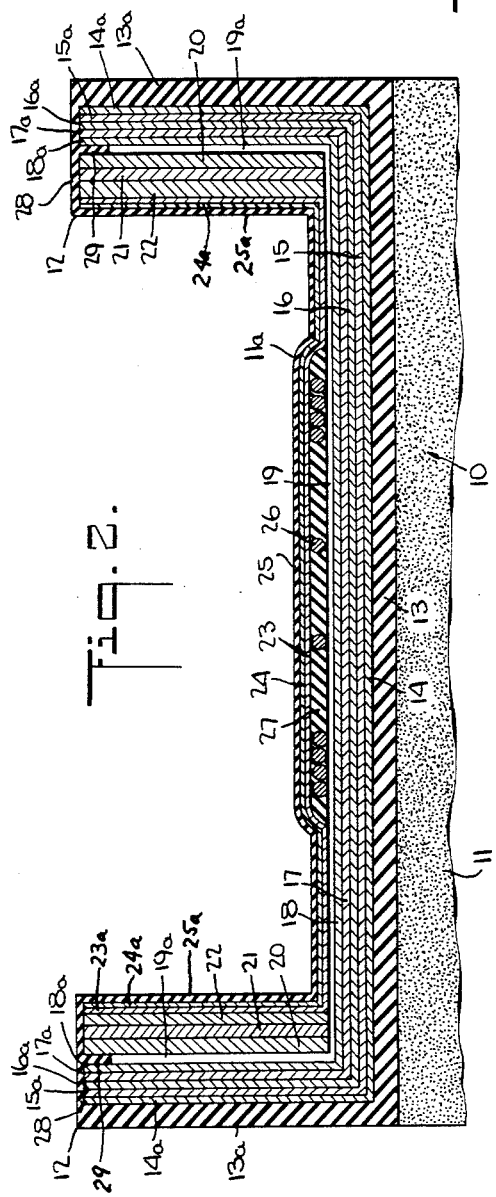
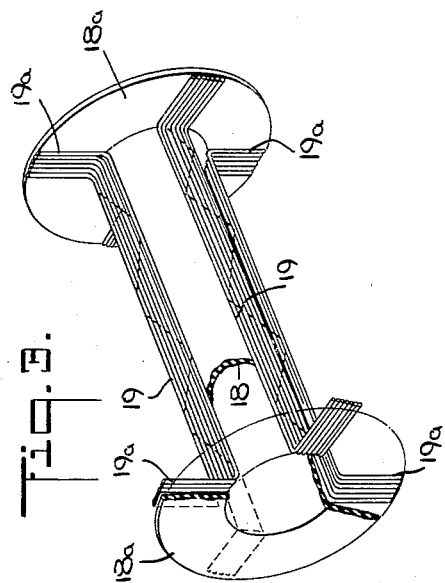
INVENTOR.
BERNARD F. BURRELL
BY Willard R. Sproule
ATTORNEY United States Patent Office 3,206,228
Patented Sept. 14, 1965

3,206,228
VIBRATION JOINTS
Bernard F. Burrell, Glen Ridge, N.J., assignor to United States Rubber Company, New York, N.Y., a corporation of New Jersey
Filed Sept. 18, 1962, Ser. No. 224,427
3 Claims. (Cl. 285—47)

This invention relates to vibration joints for use in tubular conduits.

In the heating, piping and air conditioning industries, the elimination of noise resulting from vibrations and fluid flow in the fluid handling pipe lines is a matter of great importance. Not only is the noise objectionable from the standpoint of the comfort of persons in the vicinity of such piping, but the vibrations, especially if continuing long enough, can lead to the occurrence of leaks and other structural defects in the pipe joints.

It is an object of the present invention to provide vibration joints for pipe lines, which joints are extremely sturdy in construction, resistive to physical and chemical attack by the fluids being handled or by the surrounding atmosphere, and relatively non-elongatable.

Another object of the present invention is to provide vibration joints which are reinforced longitudinally along the tubular portions thereof and radially in the respective end flanges by continuous reinforcing members so as to be able to withstand higher pressures and end thrusts than heretofore known vibration joints.

Still another object of the present invention is the provision of highly improved vibration joints which are comparable in cost to vibration joints of the known types and yet are possessed of longer useful life, thereby rendering them more economical to the ultimate purchasers and users thereof.

The foregoing and other objects of the present invention, as well as the characteristics and advantages of vibration joints conforming thereto, will be more clearly understood from a reading of the following detailed description in conjunction with the accompanying drawing, in which:

FIG. 1 is a side elevational view of a vibration joint constructed in accordance with the present invention;

FIG. 2 is an enlarged sectional view taken along the line 2—2 in FIG. 1 and illustrates the plies of the joint structure diagrammatically;

FIG. 3 is a perspective illustration of the reinforcing means included in the interior construction of the vibration joint shown in FIGS. 1 and 2; and FIG. 4 is a fragmentary plan view of a reinforcing element employed in the vibration joint construction according to this invention.

Referring now first to FIG. 1, the vibration joint 10 generally comprises an elongated tubular body 11 which is slightly bulged over its mid-region, as shown at 11a, and is provided at its opposite ends with flanges 12 provided with peripherally spaced bolt holes (not shown) by means of which the joint can be connected to a pair of opposed flanges of two elements of a fluid handling system, for example between the discharge side of a pump and the associated section of a pipe line.

As clearly shown in FIG. 2, the joint structure includes an innermost tube 13 of rubber the opposite end portions 13a of which are bent radially of the tube to form the outermost end faces of the flanges 12. Positioned about the rubber tube 13 is a tubular breaker ply 14 of rubber-coated fabric, for example a leno woven duck, the opposite end portions 14a of which are oriented parallel to and over the inner faces of the end portions 13a of the rubber tube 13. The breaker ply 14 is surrounded by two center plies 15 and 16 of rubber-coated fabric, preferably spun rayon, the end portions 15a and 16a of which, like those of the ply 14, extend into the regions of the flanges 12. It is to be understood that more than two center plies may be employed, depending on the intended physical characteristics of the vibration joint 10.

The reinforcing means with which the joint is provided in accordance with the present invention extend from one flange to the other and are arranged about the outermost one of the center plies. In the illustrated embodiment of the invention, the said reinforcing means comprise a pair of tubular plies 17 and 18 of nylon fabric and a plurality of metallic tapes 19. The fabric of which the plies 17 and 18 are made is a woven cord fabric having between about 1.8 and 2.2 picks per inch, between about 35.3 and 36.7 warps per inch, an off-the-loom width of between about 51.75 and 52.75 inches, and a weight of between about 8.8 and 9.3 ounces per square yard. Prior to being formed into tubular shape, the fabric is hot stretched and RFL treated for adhesion, and is then skim-coated with rubber. Each of the tapes 19 is composed of a plurality of high strength parallel longitudinally extending wires 19′ secured to one another in the form of a flat band by a sinusoidally interwoven binding or filler wire 19″ which passes alternately over and under the adjacent wire elements 19′ (see FIG. 4). Merely by way of example, a tape 19 may include ten 0.047 inch diameter copper-coated steel wires 19′ each having a tensile strength of 270,000 pounds per square inch and one 0.014 inch steel filler wire 19″, and the tape width may range from about 17/32 inch when under no tension to about 15/32 inch when under a tension of 100 pounds.

As clearly shown in FIGS. 2 and 3, the various reinforcing elements 17, 18 and 19 all extend essentially from the outer edge of one flange 12 to the outer edge of the other flange. Thus, the end portions 17a and 18a of the nylon reinforcement plies are disposed parallel to the corresponding portions of the breaker and center plies. The metallic tapes 19 are spaced uniformly about the axis of the vibration joint 10 and in the region of the body 11 thereof are oriented longitudinally of the same, i.e. parallel to the joint axis, but each tape has its opposite end portions 19a bent at right angles to its longitudinal dimension, and these tape end portions extend parallel to the fabric ply end portions radially through the flanges 12 although not completely to the outer edges of the latter. In the illustrated embodiment of the present invention, four tapes 19 are employed, but it will be apparent that more such tapes may be incorporated in the joint if the prescribed circumferential dimensions and pressure-handling characteristics thereof, i.e. the end thrust to which the flanges will be subjected, so dictate.

The outer covering of the joint 10 includes a plurality of annular filler plies 20, 21 and 22 of fabric, e.g. duck, in each flange. The longitudinal reaches of the tapes 19 thus extend through the central openings of the filler plies 20 to 22, and the tape end portions 19a in each flange are disposed between the associated filler ply 20 and reinforcement ply end portion 18a. The outer covering further includes another nylon fabric tubular reinforcement ply 23, a tubular cover ply 24 of duck, and a rubber tube 25, the end portions 23a, 24a and 25a of the plies 23 and 24 and the tube 25, respectively, extending radially through the respective flanges 12. For radial reinforcement of the body 11 of the vibration joint 10, a relatively large diameter steel wire 26 is spirally wound about the central region of that part of the body bounded by the metallic wire tapes 19, the turns in the center being spaced about 3/4 inch apart, and the end turns being very closely wound for anchoring purposes. The entire wire 26 is embedded in a layer 27 of rubber, and the fabric plies 23 and 24 and rubber tube 25 surround the rubber layer 27, thus forming the bulge 11a. Layers 28 of rubber cover the outer peripheral edges of the flanges 12, and the annular spaces between the nylon reinforcement ply end portions 18a and the filler plies 20, adjacent the outer flange peripheries and beyond the terminal ends of the metallic tape end portions 19a, are filled with annular strips 29 of rubber.

As previously indicated, both the tubes 13 and 25 and the flange covers 28 must be made of a material capable of withstanding the effects of the environment in which the vibration joint is to be used. For example, in systems for handling oil or other strong chemical fluids, resistance to corrosive or chemical attack by the fluids and attendant vapors is the principal consideration, while for the handling of slurries or particulate fluids it is resistant to abrasion. The material of which the tubes 13 and 25 and flange covers 28 are made has herein been stated to be rubber, but it should be understood that this term is employed to designate a variety of natural and synthetic rubber compositions and rubbery polymers. Merely by way of example, depending on environmental considerations, the material may be natural rubber, neoprene, GR–S, butyl rubber, such other synthetic rubbers as are commercially available under the trademarks "Hypalon" and "Viton," or other suitable polymers. Although it is not an indispensable feature, it is advantageous for the material to have high energy absorption characteristics.

It is to be noted that vibration joints of the types heretofore known and employing only the standard duck and rayon fabric plies and circumferentially extending metal rings or like elements between the rubber tubes are sufficiently flexible to achieve their vibration-isolating function, but also are subject to considerable elongation under increases in pressure of the fluid flowing therethrough. Tests of such known joints have shown the elongation to range from about 3.46% of the original (no-pressure) flange face to flange face length under pressures of 150 p.s.i. to as much as 6.30% of the face to face length under pressures of 200 p.s.i., with the elongation in most cases exceeding 4%. Such elongations, which are permissible in specially contoured expansion joints, are not permissible in vibration joints, and in rubber plus fabric vibration joints it is found that this elongation tends to cause leakage at the flanges and damage to both the joints and the associated piping.

This drawback is effectively overcome by the vibration joint construction according to the present invention which retains the necessary flexibility characteristics and at the same time minimizes the flange face to flange face elongation, for all practical purposes eliminating the possibility of flange distortion. Tests have shown that the elongation in vibration joints according to this invention, employing four metallic wire tapes 19 and two nylon fabric plies 17 and 18 as herein described, ranges only from about 1.27% of the original face to face length to about 1.73%, and that even under pressures of as high as 250 p.s.i. the percentage of elongation is less than in the known vibration joints. This advantageous result is due both to the relative inextensibility of the wire tapes 19 and to the fact that the bent-up tape end portions 19a serve to enhance the face to face strength, i.e. the resistance to axial deformation, of the respective flanges 12.

A vibration joint having the herein disclosed characteristics may conveniently be produced by building up the various layers or plies and reinforcing elements on a suitable mandrel or in some other conventional manner and finishing the assembly (including vulcanization, if necessary) to turn it into an essentially integral structure.

It will be understood that the foregoing description of a preferred construction according to my invention is for purposes of illustration only, and that a number of changes and modifications may be made in the disclosed structural features and relationships without departing from the spirit and scope of the present invention as defined in the appended claims.

Having thus described my invention, what I claim and desire to secure by Letters Patent is:

1. In a vibration joint of the type having a plurality of concentric plies of rubber and fabric built up into the form of a tubular body having inner and outer surfaces of rubber and terminating in outwardly directed radial end flanges defined by bent-up portions of said plies; means for reinforcing said joint so as to inhibit elongation and flange distortion under pressure of fluids flowing therethrough, comprising a plurality of concentric relatively inextensible nylon cord fabric tubes incorporated in said body, the end portions of said nylon tubes being bent radially outwardly and extending into said end flanges substantially to the radially outermost peripheries thereof; a plurality of elongated, relatively inextensible multi-wire tapes incorporated in said body radially outwardly of said nylon tubes, said tapes over the length of said body being oriented parallel to one another and to the axis of said body and being spaced from one another circumferentially of said body, and the opposite end portions of said tapes being bent up substantially perpendicularly and extending into said end flanges essentially coextensive with said end portions of said nylon tubes and means disposed about said tapes at the central region of said tubular body to provide a radial reinforcement for said body.

2. In a vibration joint of the type having a plurality of concentric plies of rubber and fabric built up into the form of a tubular body having inner and outer surfaces of rubber and terminating in outwardly directed radial end flanges defined by bent-up portions of said plies; means for reinforcing said joint so as to inhibit elongation and flange distortion under pressure of fluids flowing therethrough, comprising a plurality of concentric relatively inextensible nylon cord fabric tubes incorporated in said body, the end portions of said nylon tubes being bent radially outwardly and extending into said end flanges substantially to the radially outermost peripheries thereof; a plurality of elongated, relatively inextensible multi-wire tapes incorporated in said body about the radially outermost one of said nylon tubes, said tapes over the length of said body being oriented parallel to one another and to the axis of said body and being spaced from one another circumferentially of said body, and the opposite end portions of said tapes being bent up substantially perpendicularly and extending into said end flanges essentially coextensive with said end portions of said nylon tubes and means disposed about said tapes at the central region of said tubular body to provide a radial reinforcement for said body.

3. In a vibration joint of the type having a plurality of concentric plies of rubber and fabric built up into the form of a tubular body having inner and outer surfaces of rubber and terminating in outwardly directed radial end flanges defined by bent-up portions of said plies; means for reinforcing said joint so as to inhibit elongation and flange distortion under pressure of fluids flowing therethrough, comprising a plurality of concentric relatively inextensible nylon cord fabric tubes incorporated in said body, the end portions of said nylon tubes being bent radially outwardly and extending into said end flanges substantially to the radially outermost peripheries thereof, a plurality of elongated, relatively inextensible multi-wire tapes incorporated in said body about the radially outermost one of said nylon tubes, said tapes over the length of said body being oriented parallel to one another and to the axis of said body and being spaced from one another circumferentially of said body, the opposite end portions of said tapes being bent up substantially perpendicularly and extending into said end flanges essentially coextensive with said end portions of said nylon tubes; at least one additional nylon cord fabric tube incorporated in said body in surrounding relation to said tapes and having its end portions bent outwardly to extend into said end flanges essentially coextensive with said end portions of said tapes and means disposed about said tapes at the central region of said tubular body to provide a radial reinforcement for said body.

References Cited by the Examiner

UNITED STATES PATENTS

| | | | |
|---|---|---|---|
| 882,292 | 3/08 | Brown | 138—125 |
| 2,069,891 | 2/37 | Maclochlan | 138—133 |
| 2,150,412 | 3/39 | Berwick | 285—49 |
| 2,374,249 | 4/45 | Wadsworth | 138—138 X |
| 2,544,119 | 3/51 | Wolfe | 138—138 |
| 2,692,782 | 10/54 | Jones | 285—49 X |
| 2,784,989 | 3/57 | Krupp | 285—236 |
| 3,023,787 | 3/62 | Phillips. | |
| 3,049,385 | 8/62 | Smith | 277—227 |
| 3,051,512 | 8/62 | Cranston | 285—235 |
| 3,058,493 | 10/62 | Muller | 138—133 X |

CARL W. TOMLIN, *Primary Examiner.*